(12) United States Patent
Kumar et al.

(10) Patent No.: US 11,704,941 B1
(45) Date of Patent: Jul. 18, 2023

(54) SYSTEMS, DEVICES AND METHODS FOR MANAGING A FINGERPRINT SENSOR

(71) Applicant: QUALCOMM Incorporated, San Diego, CA (US)

(72) Inventors: Raj Kumar, San Diego, CA (US); Chun Yiu Chu, Oakland, CA (US); Manjunath Reddy, San Diego, CA (US); Deepak Rajendra Karnik, San Diego, CA (US); Seong Jun Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/045,053

(22) Filed: Oct. 7, 2022

(51) Int. Cl.
*G06V 40/60* (2022.01)
*G06V 40/50* (2022.01)
*G06V 40/12* (2022.01)
*G06F 21/44* (2013.01)
*G08B 7/06* (2006.01)
*G06F 21/32* (2013.01)
*G06V 40/13* (2022.01)

(52) U.S. Cl.
CPC .............. *G06V 40/67* (2022.01); *G06F 21/32* (2013.01); *G06F 21/44* (2013.01); *G06V 40/1318* (2022.01); *G06V 40/1376* (2022.01); *G06V 40/50* (2022.01); *G08B 7/06* (2013.01)

(58) Field of Classification Search
CPC ............... G06V 40/67; G06V 40/1318; G06V 40/1376; G06V 40/50; G06F 21/32; G06F 21/44; G08B 7/06
See application file for complete search history.

(56) References Cited

U.S. PATENT DOCUMENTS

| 2016/0063294 | A1* | 3/2016 | Du | G06V 40/1312 |
| | | | | 382/124 |
| 2016/0246396 | A1* | 8/2016 | Dickinson | G06V 40/1347 |
| 2017/0316243 | A1* | 11/2017 | Ghavanini | G06V 40/1382 |

* cited by examiner

*Primary Examiner* — Abhishek Sarma
(74) *Attorney, Agent, or Firm* — Qualcomm Incorporated

(57) ABSTRACT

Some disclosed methods may involve receiving an indication of a digit touching a surface of an apparatus in an active fingerprint sensor area, obtaining current fingerprint image data from the digit and performing a first authentication process based, at least in part, on the current fingerprint image data. Responsive to determining that the first authentication process is an unsuccessful authentication process, some methods may involve obtaining non-digit image data after the digit has been removed from the surface, performing a second authentication process based, at least in part, on the non-digit image data and providing a notification regarding the outcome of the second authentication process. In some examples, the non-digit image data may be obtained and the second authentication process may be performed without providing a notification regarding the unsuccessful outcome of the first authentication process.

30 Claims, 9 Drawing Sheets

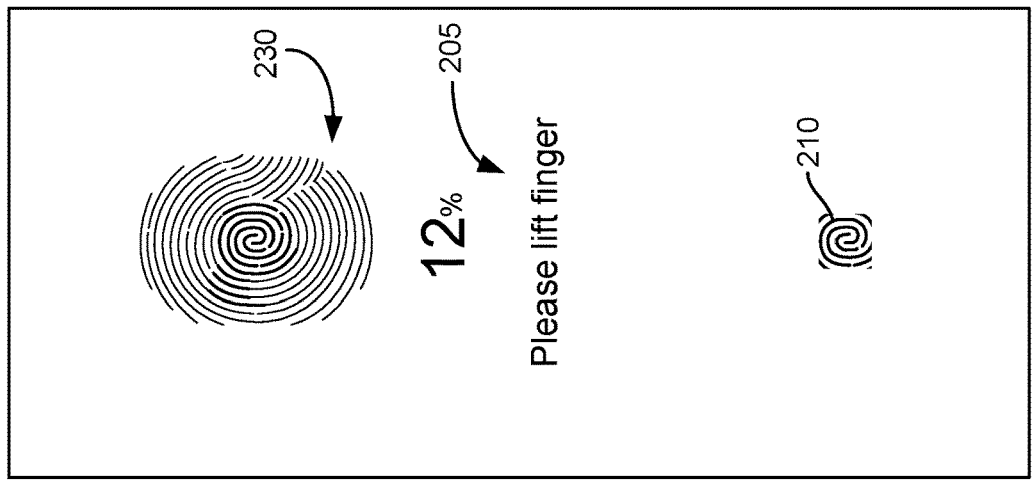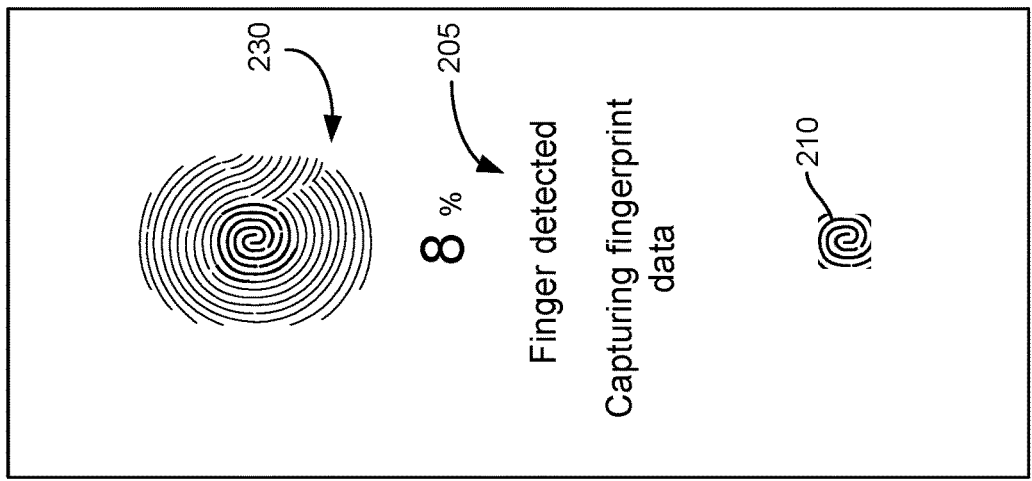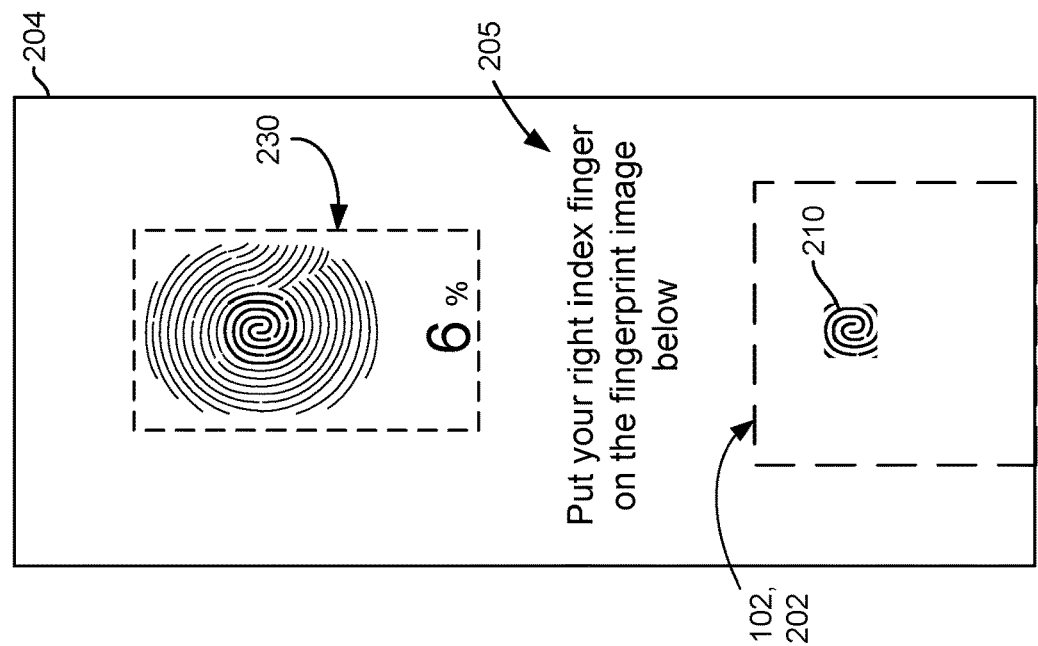

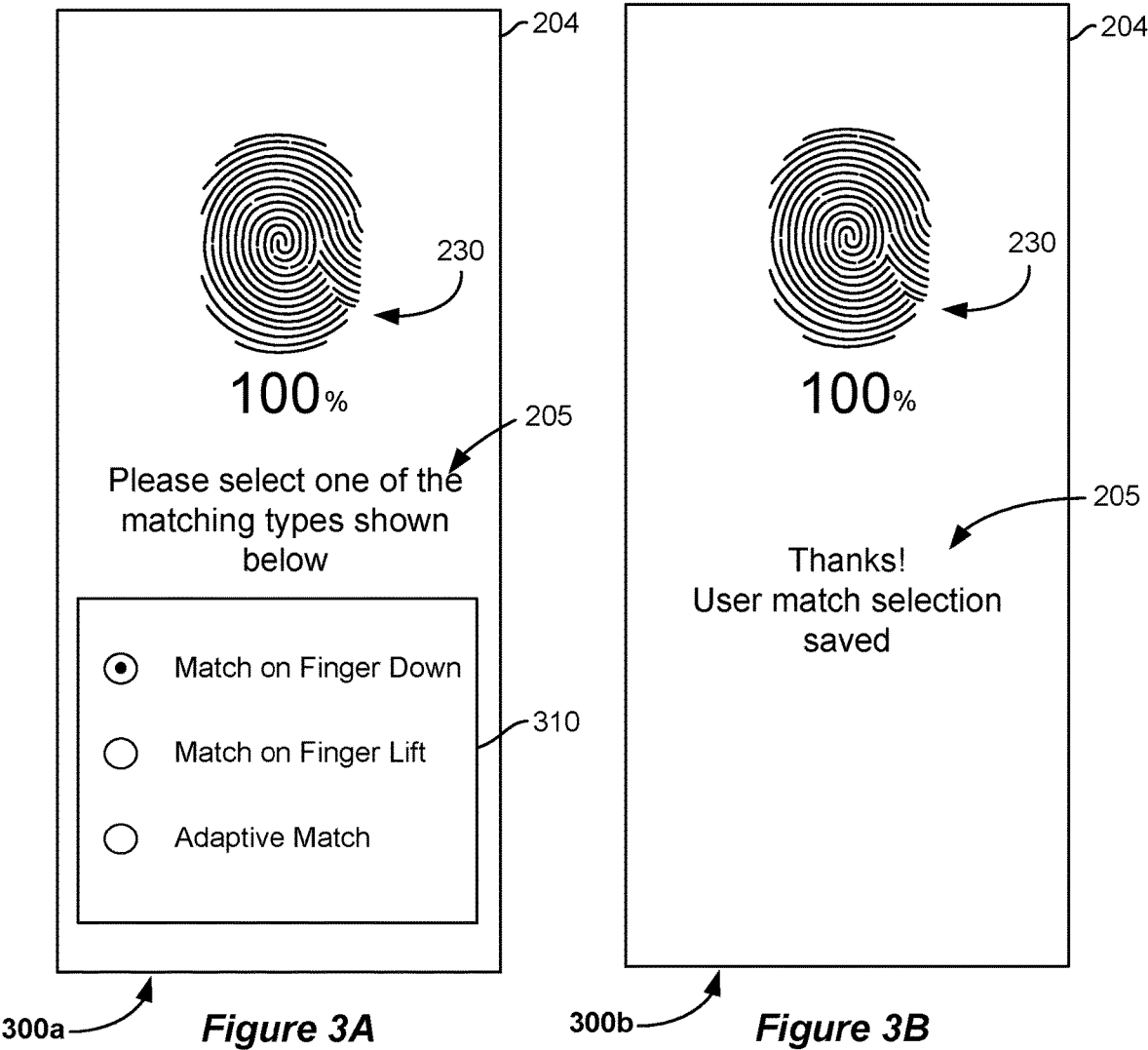

SYSTEMS, DEVICES AND METHODS FOR MANAGING A FINGERPRINT SENSOR

TECHNICAL FIELD

This disclosure relates generally to methods, apparatus and systems for controlling devices that include fingerprint sensors.

DESCRIPTION OF THE RELATED TECHNOLOGY

Biometric sensors, including fingerprint sensors, have become common features of modern life. Although some existing methods for controlling fingerprint sensors provide acceptable performance under some conditions, improved methods and devices would be desirable.

SUMMARY

The systems, methods and devices of the disclosure each have several innovative aspects, no single one of which is solely responsible for the desirable attributes disclosed herein.

One innovative aspect of the subject matter described in this disclosure may be implemented in an apparatus. According to some examples, the apparatus may be integrated into a mobile device. In some examples, the apparatus may include a fingerprint sensor system, a touch sensor system, a user interface system including one or more displays and a control system configured for communication with (such as electrically or wirelessly coupled to) the touch sensor system, the user interface system and the fingerprint sensor system. In some examples, the control system may include a memory. Alternatively, or additionally, the control system may be configured for communication with a memory that is not part of the control system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

According to some examples, the control system may be configured to receive, from the touch sensor system, an indication of a digit touching a surface of the apparatus in an active fingerprint sensor area of the fingerprint sensor system and to obtain, via the fingerprint sensor system, current fingerprint image data from the digit. In some examples, the control system may be configured to perform a first authentication process based, at least in part, on the current fingerprint image data. According to some examples, responsive to determining that the first authentication process is an unsuccessful authentication process, the control system may be configured to obtain, via the fingerprint sensor system, non-digit image data after the digit has been removed from the surface. perform a second authentication process based, at least in part, on the non-digit image data. In some examples, the control system may be configured to control the user interface system to provide a notification regarding the outcome of the second authentication process. In some examples, the notification may include at least a visual notification via the one or more displays.

In some examples, the control system may be configured to obtain the non-digit image data and to perform the second authentication process without controlling the user interface system to provide a notification regarding an outcome of the first authentication process. According to some examples, the non-digit image data may correspond to an air image.

According to some examples, the control system may be configured to control the user interface system to provide a prompt to remove the digit from the surface. In some examples, the control system may be configured to control the user interface system to provide the prompt after performing the first authentication process.

In some examples, the user interface system may include a haptic feedback system. In some such examples, the prompt may include a visual notification via the one or more displays, haptic feedback provided via the haptic feedback system, or a combination thereof.

According to some examples, the user interface system may include a loudspeaker system. In some such examples, the prompt may include a visual notification via the one or more displays, audio feedback provided via the loudspeaker system, or a combination thereof.

In some examples, the control system may be configured to perform the second authentication process without obtaining additional fingerprint image data from the digit after the first authentication process is performed.

According to some examples, the control system may be configured to extract current fingerprint features from the current fingerprint image data. In some such examples, the first authentication process may involve determining whether the current fingerprint features match previously-obtained fingerprint features. In some examples, the previously-obtained fingerprint features may include one or more ridge bifurcations, one or more ridge endings, one or more core points, one or more delta points, one or more sweat pores, one or more ridge contours, one or more ridge edge features, or combinations thereof.

Other innovative aspects of the subject matter described in this disclosure may be implemented in a method. In some examples, the method may involve receiving, by a control system and from a touch sensor system, an indication of a digit touching a surface of an apparatus in an active fingerprint sensor area of a fingerprint sensor system. According to some examples, the method may involve obtaining, by the control system and via the fingerprint sensor system, current fingerprint image data from the digit. In some examples, the method may involve performing, by the control system, a first authentication process based, at least in part, on the current fingerprint image data. According to some examples, the method may involve, responsive to determining that the first authentication process is an unsuccessful authentication process, obtaining, by the control system and via the fingerprint sensor system, non-digit image data after the digit has been removed from the surface. In some examples, the method may involve performing, by the control system, a second authentication process based, at least in part, on the non-digit image data and controlling, by the control system, a user interface system to provide a notification regarding the outcome of the second authentication process. In some examples, the notification may include at least a visual notification via one or more displays of the user interface system.

According to some examples, the method may involve obtaining the non-digit image data and performing the second authentication process without controlling the user interface system to provide a notification regarding an outcome of the first authentication process. In some examples, the non-digit image data may correspond to an air image.

In some examples, the method may involve controlling the user interface system to provide a prompt to remove the digit from the surface. In some such examples, the method may involve controlling the user interface system to provide the prompt after performing the first authentication process. According to some examples, the user interface system may include a haptic feedback system and the prompt may include a visual notification via the one or more displays, haptic feedback provided via the haptic feedback system, or a combination thereof. In some examples, the user interface system may include a loudspeaker system and the prompt may include a visual notification via the one or more displays, audio feedback provided via the loudspeaker system, or a combination thereof.

According to some examples, the method may involve performing the second authentication process without obtaining additional fingerprint image data from the digit after the first authentication process is performed.

In some examples, the method may involve extracting current fingerprint features from the current fingerprint image data. In some such examples, the first authentication process may involve determining whether the current fingerprint features match previously-obtained fingerprint features. According to some examples, the fingerprint features (whether previously-obtained or current) may include one or more ridge bifurcations, one or more ridge endings, one or more core points, one or more delta points, one or more sweat pores, one or more ridge contours, one or more ridge edge features, or combinations thereof.

Some or all of the operations, functions or methods described herein may be performed by one or more devices according to instructions (such as software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in one or more non-transitory media having software stored thereon. For example, the software may include instructions for controlling one or more devices to perform a method. In some examples, the method may involve receiving, by a control system and from a touch sensor system, an indication of a digit touching a surface of an apparatus in an active fingerprint sensor area of a fingerprint sensor system. According to some examples, the method may involve obtaining, by the control system and via the fingerprint sensor system, current fingerprint image data from the digit. In some examples, the method may involve performing, by the control system, a first authentication process based, at least in part, on the current fingerprint image data. According to some examples, the method may involve, responsive to determining that the first authentication process is an unsuccessful authentication process, obtaining, by the control system and via the fingerprint sensor system, non-digit image data after the digit has been removed from the surface. In some examples, the method may involve performing, by the control system, a second authentication process based, at least in part, on the non-digit image data and controlling, by the control system, a user interface system to provide a notification regarding the outcome of the second authentication process. In some examples, the notification may include at least a visual notification via one or more displays of the user interface system.

According to some examples, the method may involve obtaining the non-digit image data and performing the second authentication process without controlling the user interface system to provide a notification regarding an outcome of the first authentication process. In some examples, the non-digit image data may correspond to an air image.

In some examples, the method may involve controlling the user interface system to provide a prompt to remove the digit from the surface. In some such examples, the method may involve controlling the user interface system to provide the prompt after performing the first authentication process. According to some examples, the user interface system may include a haptic feedback system and the prompt may include a visual notification via the one or more displays, haptic feedback provided via the haptic feedback system, or a combination thereof. In some examples, the user interface system may include a loudspeaker system and the prompt may include a visual notification via the one or more displays, audio feedback provided via the loudspeaker system, or a combination thereof.

According to some examples, the method may involve performing the second authentication process without obtaining additional fingerprint image data from the digit after the first authentication process is performed.

In some examples, the method may involve extracting current fingerprint features from the current fingerprint image data. In some such examples, the first authentication process may involve determining whether the current fingerprint features match previously-obtained fingerprint features. According to some examples, the fingerprint features (whether previously-obtained or current) may include one or more ridge bifurcations, one or more ridge endings, one or more core points, one or more delta points, one or more sweat pores, one or more ridge contours, one or more ridge edge features, or combinations thereof.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIGS. 2A, 2B, 2C, 2D, 2E and 2F show examples of graphical user interfaces (GUIs) that may be presented during a fingerprint data and non-fingerprint data capture phase of a user enrollment process.

FIGS. 3A and 3B show examples of GUIs that may be presented during a match selection phase of a user enrollment process.

Like reference numbers and designations in the various drawings indicate like elements.

DETAILED DESCRIPTION

Figure 1:
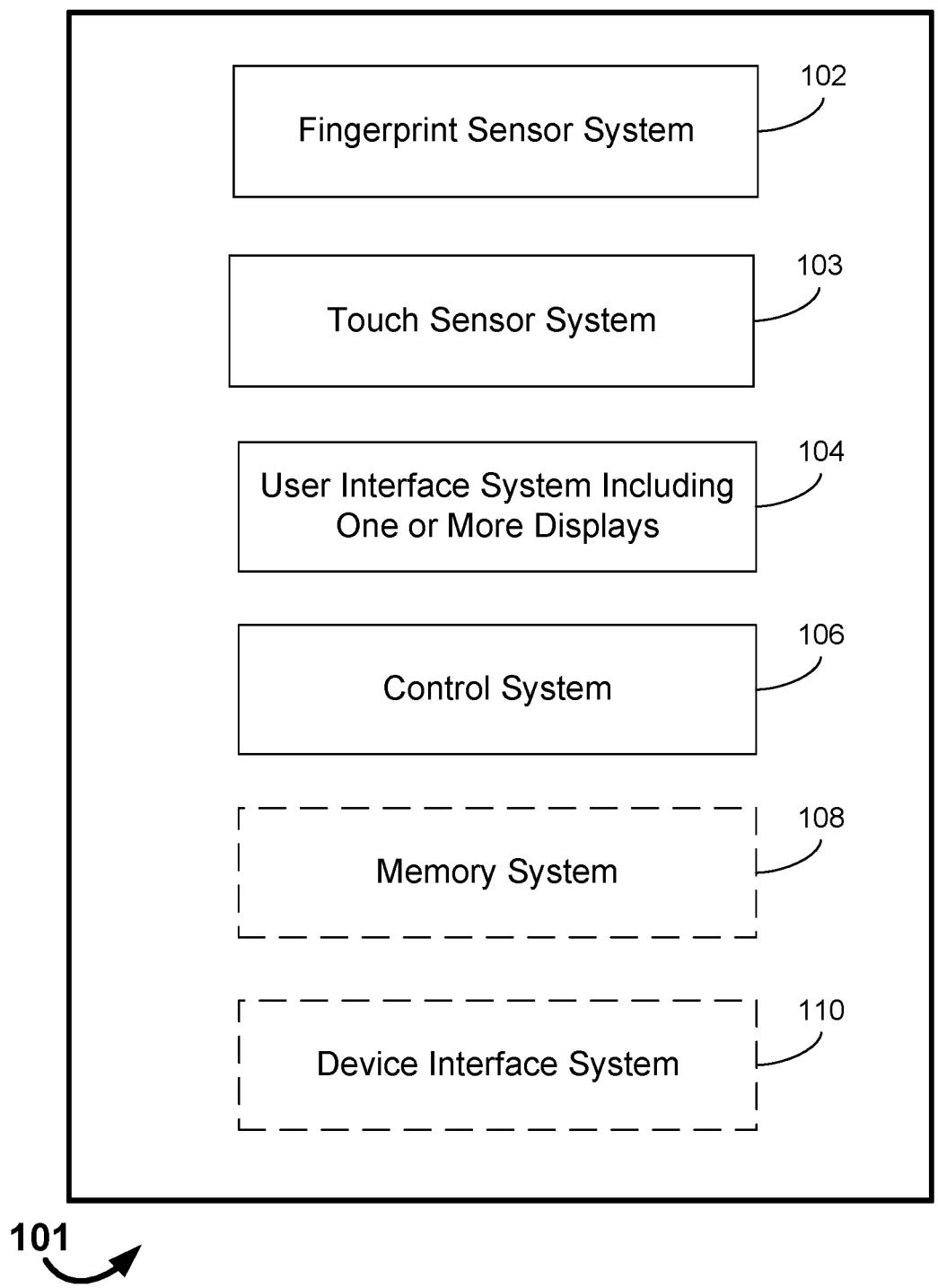
FIG. 1 is a block diagram that illustrates example components of an apparatus.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (such as e-readers), mobile health devices, computer monitors, automobile components, including but not limited to automobile displays (such as odometer and speedometer displays, etc.), cockpit controls or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

The word "finger" as used herein may correspond to any digit, including a thumb. Accordingly, a thumbprint is a type of fingerprint. As used herein, the "active region" or "active area" of a fingerprint sensor system refers to an area of the fingerprint sensor system from which fingerprint image data may be obtained. The active region or area may, for example, include an array of fingerprint sensor pixels. Data received from the fingerprint sensor system may be referred to herein as "fingerprint sensor data," "fingerprint image data," etc., whether or not the received data corresponds to an actual digit or another object from which the fingerprint sensor system has received data. Such data will generally be received from the fingerprint sensor system in the form of electrical signals. Accordingly, without additional processing such image data would not necessarily be perceivable by a human being as an image.

Many fingerprint sensor systems are configured to capture a background image, sometimes referred to as an "air image," when a user is not touching the surface of a device in an area corresponding to an active region of a fingerprint sensor. Background image data may be used to process fingerprint image data obtained by the fingerprint sensor system in order to more accurately distinguish a fingerprint image from fingerprint sensor data corresponding to background noise, local defects of the fingerprint sensor, dirt on the device surface in the active region, damage to the device surface in the active region, etc. For example, an air image may be subtracted from a fingerprint image.

In previously-deployed fingerprint sensor systems, a fingerprint match result is normally reported when a user's finger is in a "finger down" state, when the user's finger is still in contact with an outer surface of a device in an area corresponding to an active region of a fingerprint sensor. Previously-captured background image data are used for processing the currently-obtained "finger-down" fingerprint image data. This is not optimal, because the actual background conditions change over time in response to changes in temperature, other transient environmental or device effects, etc.

In some disclosed examples, responsive to determining that a first fingerprint authentication process for a digit is unsuccessful, non-digit image data (such as air image data) may be obtained after the digit has been removed from a device surface corresponding to an active fingerprint sensor area. Some examples may involve providing a user prompt to remove the digit from the surface. The non-digit image data may, in some examples, be obtained responsive to an indication that the digit has been removed from the device surface. A second authentication process may be performed that is based, at least in part, on the non-digit image data. According to some such examples, the non-digit image data may be obtained and the second authentication process may be performed without providing a notification regarding the unsuccessful outcome of the first authentication process.

Particular implementations of the subject matter described in this disclosure may be implemented to realize one or more of the following potential advantages. In some examples, a successful authentication process may result from only a single "finger down" event, even after an initial failed authentication attempt, without requiring a user to repeatedly place his or her finger on the device. According to some examples, a successful authentication process may result from only a single "finger down" event, even after an initial failed authentication attempt, without the user even being aware of the initial failed authentication attempt. Such examples can provide a more satisfying user experience. Moreover, such examples may use less power and may prolong the useful lifetime of the fingerprint sensor system, at least in part because additional and potentially unnecessary fingerprint scans may be avoided.

FIG. 1 is a block diagram that illustrates example components of an apparatus. In this example, the apparatus 101 includes a fingerprint sensor system 102, a touch sensor system 103, a user interface system 104 and a control system 106. In this example, the user interface system 104 includes one or more displays. Some implementations may include a memory system 108, a device interface system 110, or a combination thereof.

In some examples, the fingerprint sensor system 102 may be part of a biometric authentication system that includes a voice recognition system, a retinal scanner, a retinal scan recognition system, a face recognition system, a palm scanning system, or combinations thereof.

In some examples, the fingerprint sensor system 102 may be, or may include, a ultrasonic fingerprint sensor. Alternatively, or additionally, in some implementations the fingerprint sensor system 102 may be, or may include, an optical fingerprint sensor. In some examples, an ultrasonic version of the fingerprint sensor system 102 may include an ultrasonic receiver and a separate ultrasonic transmitter. In some such examples, the ultrasonic transmitter may include an ultrasonic plane-wave generator. However, various examples of ultrasonic fingerprint sensors are disclosed herein, some of which may include a separate ultrasonic transmitter and some of which may not. For example, in some implementations, the fingerprint sensor system 102 may include a piezoelectric receiver layer, such as a layer of polyvinylidene fluoride PVDF polymer or a layer of polyvinylidene fluoride-trifluoroethylene (PVDF-TrFE) copolymer. In some implementations, a separate piezoelectric layer may serve as the ultrasonic transmitter. In some implementations, a single piezoelectric layer may serve as both a transmitter and a receiver. The fingerprint sensor system 102 may, in some examples, include an array of ultrasonic transducer elements, such as an array of piezoelectric micromachined ultrasonic transducers (PMUTs), an array of capacitive micromachined ultrasonic transducers (CMUTs), etc. In some such examples, PMUT elements in a single-layer array of PMUTs or CMUT elements in a single-layer array of CMUTs may be used as ultrasonic transmitters as well as ultrasonic receivers.

Data received from a fingerprint sensor of the fingerprint sensor system 102 may sometimes be referred to herein as "fingerprint sensor data," "fingerprint image data," etc., whether or not the received data corresponds to an actual digit or another object from which the fingerprint sensor system 102 has received data. Such data will generally be received from the fingerprint sensor system in the form of electrical signals. Accordingly, without additional processing such image data would not necessarily be perceivable by a human being as an image. As noted elsewhere herein, the word "finger" as used herein may correspond to any digit, including a thumb. Accordingly, a thumbprint is a type of fingerprint.

The touch sensor system 103 may be, or may include, a resistive touch sensor system, a surface capacitive touch sensor system, a projected capacitive touch sensor system, a surface acoustic wave touch sensor system, an infrared touch sensor system, any other suitable type of touch sensor system, or combinations thereof. In some implementations, the area of the touch sensor system 103 may extend over most or all of a display of the user interface system 104.

In some examples, the user interface system 104 may be configured to provide, or to facilitate, communication between the apparatus 101 and a human being. In this example, the user interface system 104 includes one or more displays. In some examples, one or more displays may be, or may include, a light-emitting diode (LED) display, such as an organic light-emitting diode (OLED) display. According to some examples, the user interface system 104 may include a haptic feedback system, a loudspeaker system, a microphone system, or combinations thereof. In some examples, one or more user interfaces of the user interface system 104 may be provided via the touch sensor system 103. Accordingly, while the user interface system 104 and the touch sensor system 103 are shown as separate elements in FIG. 1, in some implementations the user interface system 104 may include one or more of these elements, other elements or combinations thereof. According to some examples, the user interface system 104 may be configured to provide, or may facilitate, interactions with the apparatus 101 via voice commands.

The control system 106 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. According to some examples, the control system 106 also may include one or more memory devices, such as one or more random access memory (RAM) devices, read-only memory (ROM) devices, etc. In this example, the control system 106 is configured for communication with, and for controlling, the fingerprint sensor system 102. According to this implementation, the control system 106 is configured for communication with the touch sensor system 103. In implementations where the apparatus includes a memory system 108 that is separate from the control system 106, the control system 106 also may be configured for communication with the memory system 108. In implementations where the apparatus includes a microphone system, the control system 106 may be configured for communication with, and for controlling, the microphone system. In implementations where the apparatus includes a loudspeaker system, the control system 106 may be configured for communication with, and for controlling, the loudspeaker system. In implementations where the apparatus includes a haptic system, the control system 106 may be configured for communication with, and for controlling, the haptic system. According to some examples, the control system 106 may include one or more dedicated components for controlling one or more components of the apparatus 101. In some implementations, functionality of the control system 106 may be partitioned between one or more controllers or processors, such as between a dedicated sensor controller and an applications processor of a mobile device.

In some examples, the memory system 108 may include one or more memory devices, such as one or more RAM devices, ROM devices, etc. In some implementations, the memory system 108 may include one or more computer-readable media, storage media or storage media. Computer-readable media include both computer storage media and communication media including any medium that may be enabled to transfer a computer program from one place to another. Storage media may be any available media that may be accessed by a computer. In some examples, the memory system 108 may include one or more non-transitory media. By way of example, and not limitation, non-transitory media may include RAM, ROM, electrically erasable programmable read-only memory (EEPROM), compact disc ROM (CD-ROM) or other optical disk storage, magnetic disk storage or other magnetic storage devices, or any other medium that may be used to store desired program code in the form of instructions or data structures and that may be accessed by a computer.

Some implementations of the apparatus 101 may include an device interface system 110. In some examples, the device interface system 110 may include a wireless interface system. In some implementations, the device interface system 110 may include one or more network interfaces, one or more interfaces between the control system 106 and the fingerprint sensor system 102, one or more interfaces between the control system 106 and the touch sensor system 103, one or more interfaces between the control system 106 and the user interface system 104, one or more interfaces between the control system 106 and the memory system 108, one or more interfaces between the control system 106 and one or more external device interfaces (such as ports or applications processors), or combinations thereof.

The device interface system 110 may be configured to provide communication (which may include wired or wireless communication, electrical communication, radio communication, etc.) between components of the apparatus 101. In some such examples, the device interface system 110 may be configured to provide communication between the control system 106 and the fingerprint sensor system 102. According to some examples, the device interface system 110 may couple at least a portion of the control system 106 to the fingerprint sensor system 102 and the device interface system 110 may couple at least a portion of the control system 106 to the touch sensor system 103, such as via electrically conducting material (for example, via conductive metal wires or traces). According to some examples, the device interface system 110 may be configured to provide communication between the apparatus 101 and one or more other devices. The device interface system 110 may, in some examples, include one or more network interfaces or one or more external device interfaces (such as one or more universal serial bus (USB) interfaces or a serial peripheral interface (SPI)).

In some implementations, the apparatus 101 may include a gesture sensor system. The gesture sensor system may be, or may include, an ultrasonic gesture sensor system, an optical gesture sensor system or any other suitable type of gesture sensor system.

The apparatus 101 may be used in a variety of different contexts, some examples of which are disclosed herein. For example, in some implementations a mobile device may include at least a portion of the apparatus 101. In some implementations, a wearable device may include at least a portion of the apparatus 101. The wearable device may, for example, be a bracelet, an armband, a wristband, a ring, a headband or a patch. In some implementations, the control system 106 may reside in more than one device. For example, a portion of the control system 106 may reside in a wearable device and another portion of the control system 106 may reside in another device, such as a mobile device (for example, a smartphone). In other examples, a portion of the control system 106 may reside in a local device (such as a mobile device) and another portion of the control system 106 may reside in a remote device, such as a server. The device interface system 110 also may, in some such examples, reside in more than one device.

FIGS. 2A, 2B, 2C, 2D, 2E and 2F show examples of graphical user interfaces (GUIs) that may be presented during a fingerprint data and non-fingerprint data capture phase of a user enrollment process. In these examples, the disclosed GUIs are being presented by an instance of the apparatus 101 of FIG. 1. As with other disclosed implementations, the types, numbers and arrangements of elements in the disclosed GUIs are merely made by way of example and are not intended to be limiting. Other GUI implementations that are within the scope of the present disclosure may have different types, numbers and/or arrangements of elements.

According to the examples shown in FIGS. 2A-2F, a control system (not shown) is controlling a display system 204 to present GUIs 200*a*, 200*b*, 200*c*, 200*d*, 200*e* and 200*f*, respectively, each of which includes a message area 205, a fingerprint sensor system area icon 210 and a progress indicator 230. In this example, the display system 204 is a component of the user interface system 104 of FIG. 1. According to this example, the fingerprint sensor system area icon 210 resides within an active fingerprint sensor area 202 of the fingerprint sensor system 102. In this example, the dashed outlines surrounding the active fingerprint sensor area 202 and the progress indicator 230 are merely shown for informational purposes. The active fingerprint sensor area 202 may or may not be represented in a GUI, depending on the particular implementation.

In the example shown in FIG. 2A, the message area 205 includes a prompt for the user to place a right index finger on the fingerprint sensor system area icon 210. As with other textual prompt examples disclosed herein, in some implementations the apparatus 101 may provide one or more corresponding prompts, such as an audio prompt corresponding to the text in the message area 205. In this instance, the progress indicator 230 shows that the fingerprint data and non-fingerprint data capture phase is 6% complete, indicating that some fingerprint data, non-fingerprint data or combinations thereof have already been captured.

In the GUI 200*b* of FIG. 2B, the message area 205 includes text indicating that the finger has been detected and that additional fingerprint data are being captured. In this instance, the progress indicator 230 shows that the fingerprint data and non-fingerprint data capture phase is 8% complete.

In the GUI 200*c* of FIG. 2C, the message area 205 includes a prompt for the user to lift the finger. In this instance, the progress indicator 230 shows that the fingerprint data and non-fingerprint data capture phase is 12% complete.

Figure 2F:
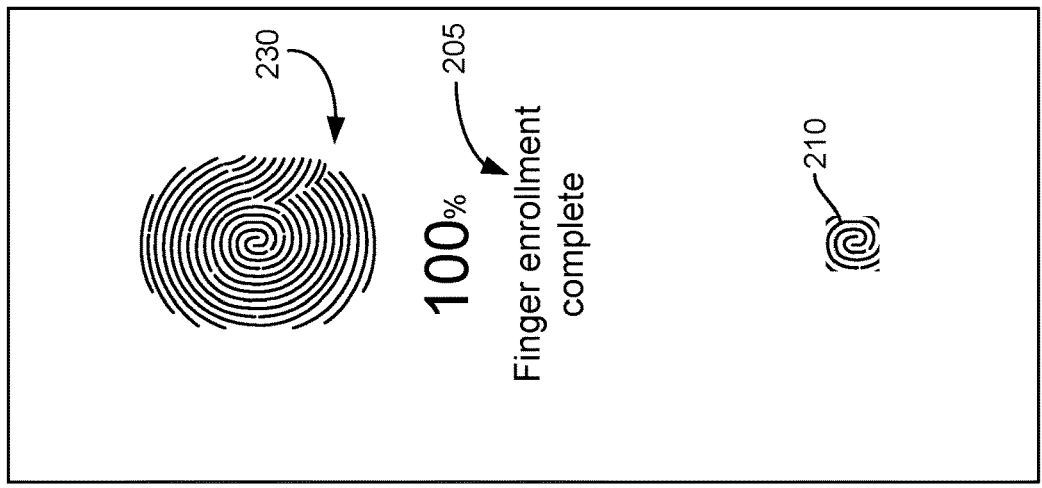
Figure 2E:
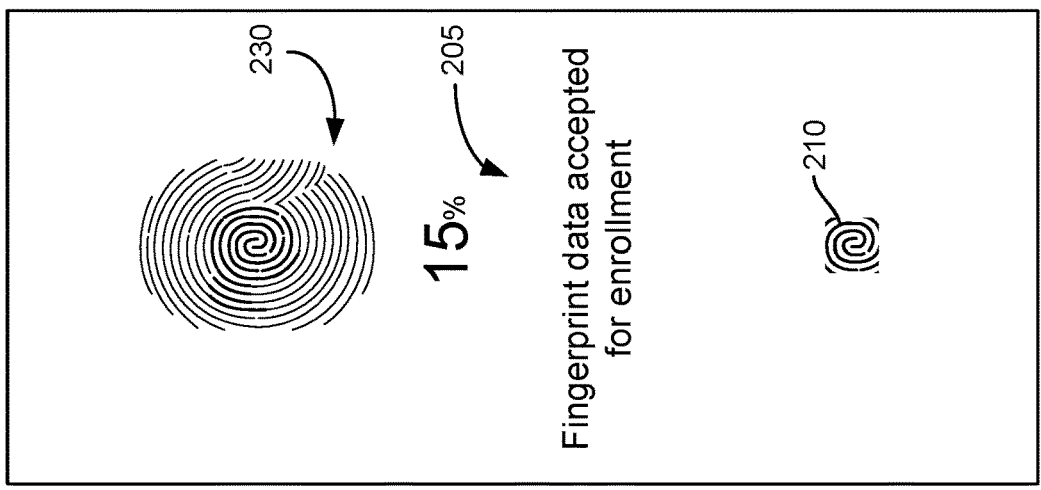
Figure 2D:
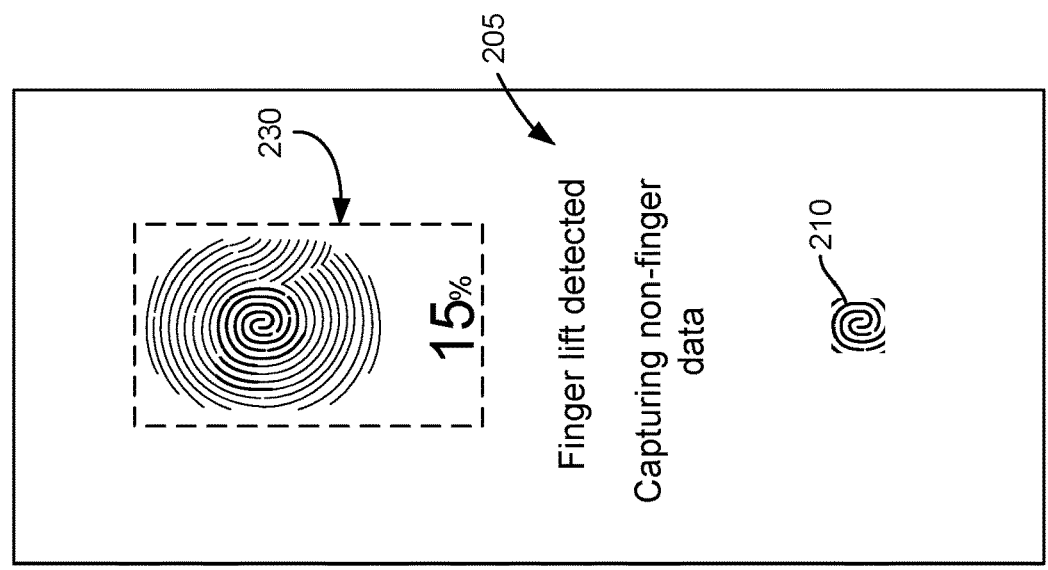

In the GUI 200*d* of FIG. 2D, the message area 205 includes text indicating that the finger lift has been detected and that non-finger data are being collected. According to some such examples, the non-finger data may be, or may include, an "air image" obtained by the ultrasonic sensor system 102 after the finger has been lifted from the apparatus 101. In some examples, the control system may process the recently-obtained fingerprint data using the non-finger data prior to storing the recently-obtained fingerprint data. For example, the control system may subtract the non-finger data from the recently-obtained fingerprint data before storing the recently-obtained fingerprint data.

In the GUI 200*e* of FIG. 2E, the message area 205 includes text indicating that the recently-obtained fingerprint data have been accepted for enrollment. In some such examples, this message may indicate that the recently-obtained fingerprint data, or corresponding fingerprint feature data that have been extracted from the recently-obtained fingerprint data, have been stored for future use. In this instance, the progress indicator 230 shows that the fingerprint data and non-fingerprint data capture phase is 15% complete.

In the GUI 200*f* of FIG. 2F, the message area 205 includes text indicating that the fingerprint data and non-fingerprint data capture phase of the user enrollment process has been completed. In this instance, the progress indicator 230 shows that the fingerprint data and non-fingerprint data capture phase is 100% complete. The dots shown between FIGS. 2E and 2F represent additional instances of capturing fingerprint data and non-fingerprint data.

FIGS. 3A and 3B show examples of GUIs that may be presented during a match selection phase of a user enrollment process. In these examples, the disclosed GUIs are being presented by an instance of the apparatus 101 of FIG. 1. As with other disclosed implementations, the types, numbers and arrangements of elements in the disclosed GUIs are merely made by way of example and are not intended to be limiting. Other GUI implementations that are within the scope of the present disclosure may have different types, numbers and/or arrangements of elements.

According to the examples shown in FIGS. 3A and 3B, a control system (not shown) is controlling a display system 204 to present GUIs 300*a* and 300*b*, respectively, both of which include a message area 205 and a progress indicator 230. In these examples, the display system 204 is a component of the user interface system 104 of FIG. 1. In these examples, the progress indicator 230 shows that the fingerprint data and non-fingerprint data capture phase is 100% complete. According to these examples, the match selection phase of a user enrollment process follows the fingerprint data and non-fingerprint data capture phase. However, in other examples, the match selection phase of a user enrollment process may precede the fingerprint data and non-fingerprint data capture phase.

In the example shown in FIG. 3A, the message area 205 includes a prompt for the user to select one of the matching types that are shown in the match selection area 310. In some examples, the match selection area 310 indicates the stage at which the user will be informed of whether there is a match between fingerprint data obtained during an authentication attempt and fingerprint data obtained during an enrollment process. According to some examples, the match selection area 310 indicates the stage at which the user will be informed when there is not a match between fingerprint data obtained during an authentication attempt and fingerprint data obtained during an enrollment process. Here, "match on finger down" has been selected. According to some examples, if "match on finger down" is selected, the user will be informed of whether there is a match while the user's finger is still down, just after fingerprint data has been obtained during an enrollment process. In some examples, if "match on finger down" is selected, the user will be informed if there is not a match while the user's finger is still down, just after fingerprint data has been obtained during an enrollment process. In some implementations, the control system may be configured to make "match on finger down" a default option if the quality of fingerprint data obtained during the enrollment process was relatively high, for example above a fingerprint data quality threshold. According to some examples, fingerprint data quality or image quality may be quantified based on a signal-to-noise ratio (SNR), such as the ratio of the fingerprint signal level to a background noise level. In some examples, fingerprint data quality or image quality may be quantified by comparing one or more parameters such as contrast, gain, useful fingerprint features for matching, or combinations thereof. According to some examples, categories such as "normal finger," "dry-finger," "challenging finger" (for example, with destroyed ridge and valley patterns due to prolonged use of the finger) may be used to define one or more fingerprint data quality thresholds.

In some examples, if "match on finger lift" is selected, the user will not be informed of a failed authentication attempt while the user's finger is still down, just after fingerprint data has been obtained during an enrollment process. Instead, in some such examples, the user will not be informed of the outcome of the authentication attempt until after the finger has been lifted, after non-finger data has been obtained, after the fingerprint data that has just been obtained is processed with the non-finger data and after the processed fingerprint data is compared to fingerprint data obtained during the enrollment process. In some examples, even if "match on finger lift" is selected, a user may nonetheless be informed of a successful authentication attempt while the finger is still down. In some examples, if "match on finger lift" has been selected, a user may be expressly informed of a successful authentication attempt by an express indication, such as a visual indication, and audio indication, or a combination thereof. Alternatively, in some examples, if "match on finger lift" has been selected, a user may only be implicitly informed of a successful authentication attempt, such as by the display of an "unlock screen" like that of FIG. 4D. In some implementations, the control system may be configured to make "match on finger lift" a default option if the quality of fingerprint data obtained during the enrollment process was relatively low, for example below a fingerprint data quality threshold.

According to some examples, if "adaptive match" is selected, the user may or may not be informed of a failed authentication attempt while the user's finger is still down. Whether the user will be informed of a failed authentication attempt while the user's finger is still down may, for example, be based at least in part on the quality of recently-obtained fingerprint data from the user.

In some examples, if "adaptive match" has been selected and if the quality of recently-obtained fingerprint data is high, the user may be informed of a failed authentication attempt while the user's finger is still down. For example, if the last N instances of recently-obtained fingerprint data were above a fingerprint data quality threshold, the user may be informed of a failed authentication attempt while the user's finger is still down. In another example, if the last N instances of recently-obtained fingerprint data had an average fingerprint data quality that was above a fingerprint data quality threshold, the user may be informed of a failed authentication attempt while the user's finger is still down.

In some examples, if "adaptive match" has been selected and if the quality of recently-obtained fingerprint data is not high, the user may not be informed of a failed authentication attempt while the user's finger is still down. For example, if the last N instances of recently-obtained fingerprint data were at or below a fingerprint data quality threshold, the user may not be informed of a failed authentication attempt while the user's finger is still down. In another example, if the last N instances of recently-obtained fingerprint data had an average fingerprint data quality that was at or below a fingerprint data quality threshold, the user may not be informed of a failed authentication attempt while the user's finger is still down.

In the foregoing examples, N is an integer. In some such examples, N may be 5, 6, 7, 8, 9, 10, 11, 12, 13, 14, 15, etc. In some alternative examples, N may be less than 5 or greater than 15.

FIGS. 4A, 4B, 4C and 4D show additional examples of GUIs that may be used to implement aspects of the present disclosure. In these examples, the disclosed GUIs are being presented by an instance of the apparatus 101 of FIG. 1. As with other disclosed implementations, the types, numbers and arrangements of elements in the disclosed GUIs are merely made by way of example and are not intended to be limiting. Other GUI implementations that are within the scope of the present disclosure may have different types, numbers and/or arrangements of elements.

According to the examples shown in FIGS. 4A-4D, a control system (not shown) is controlling a display system 204 to present GUIs 400a, 400b, 400c and 400d, respectively. In these examples, the display system 204 is a component of the user interface system 104 of FIG. 1.

Figure 4A:
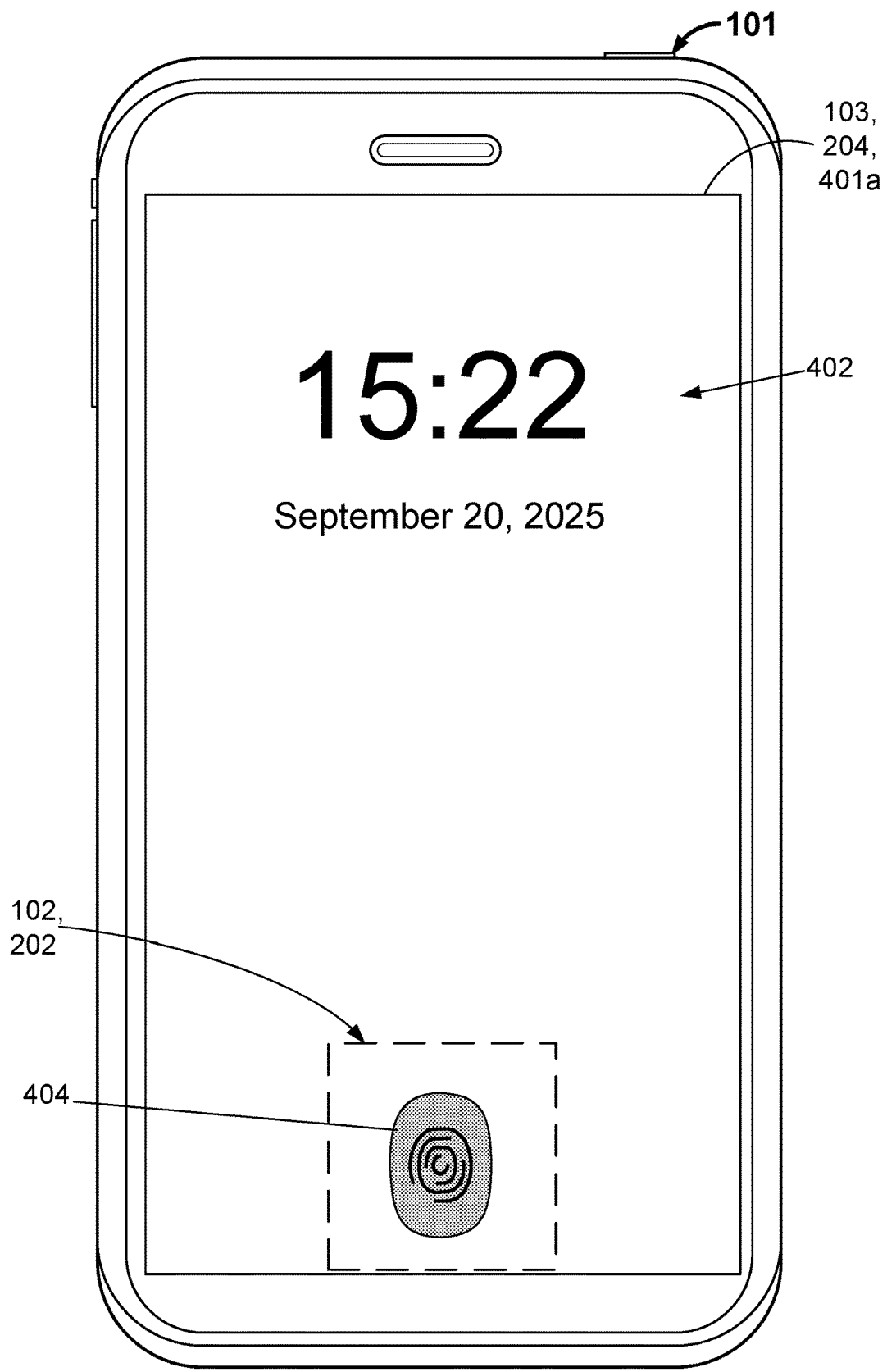
FIGS. 4A, 4B, 4C and 4D show additional examples of GUIs that may be used to implement aspects of the present disclosure.

FIG. 4A shows an example of a GUI 401a. In this example, the GUI 401a is an example of a "lock screen," indicating that the apparatus 101 is in a locked condition. Here, the GUI 401a includes a time and date presentation area 402 and a fingerprint icon 404 that resides within an active fingerprint sensor area 202 of the fingerprint sensor system 102. In some examples, the GUI 401a may include a textual prompt area that includes a message prompting a user to place a finger on the fingerprint icon 404 in order to unlock the apparatus 101. According to some such examples, the textual prompt area may include a message prompting a user to place a particular finger (such as the right thumb, the left pinky finger, etc.) on the fingerprint icon 404.

Figure 4B:
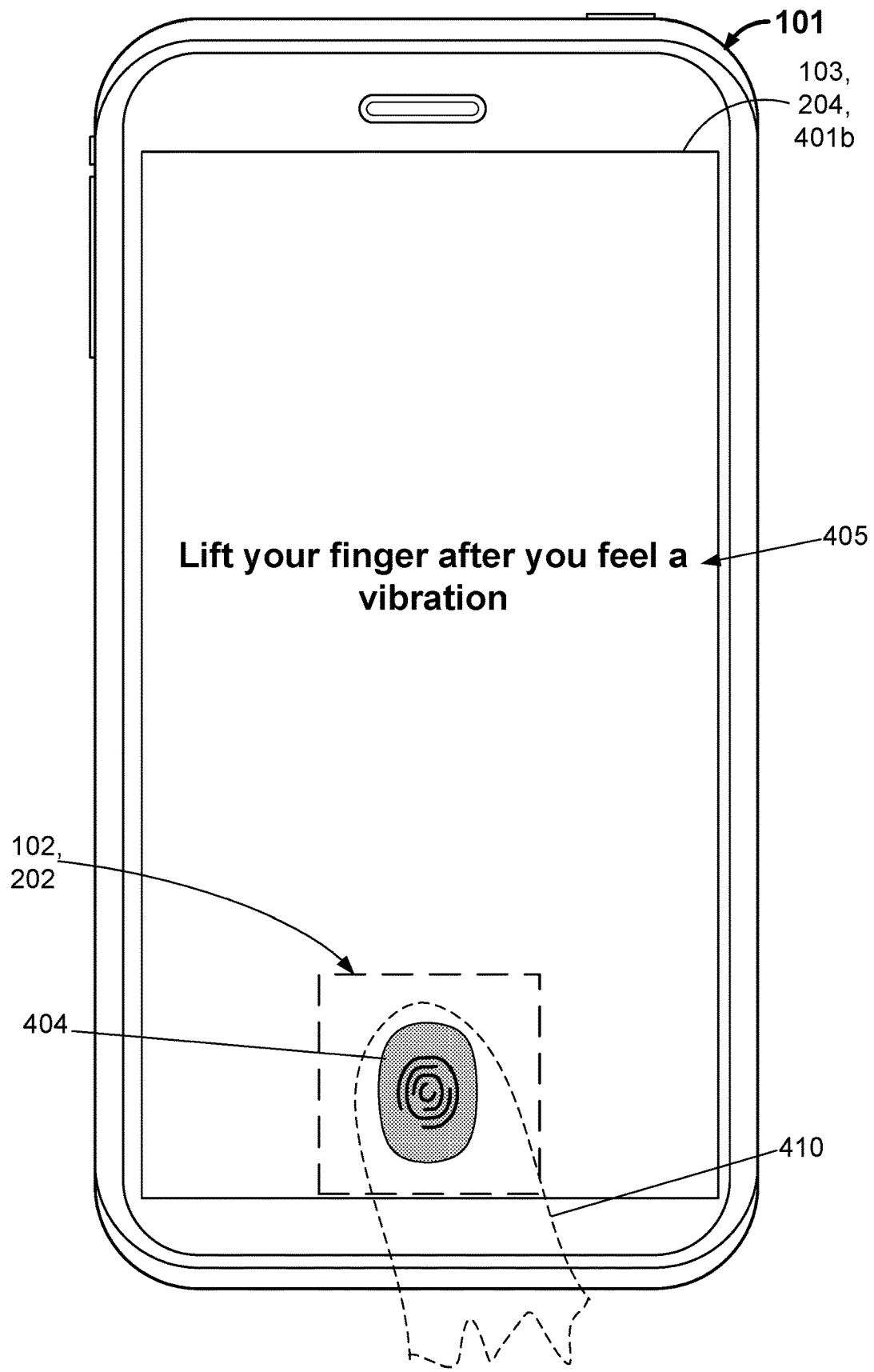
Figure 4C:
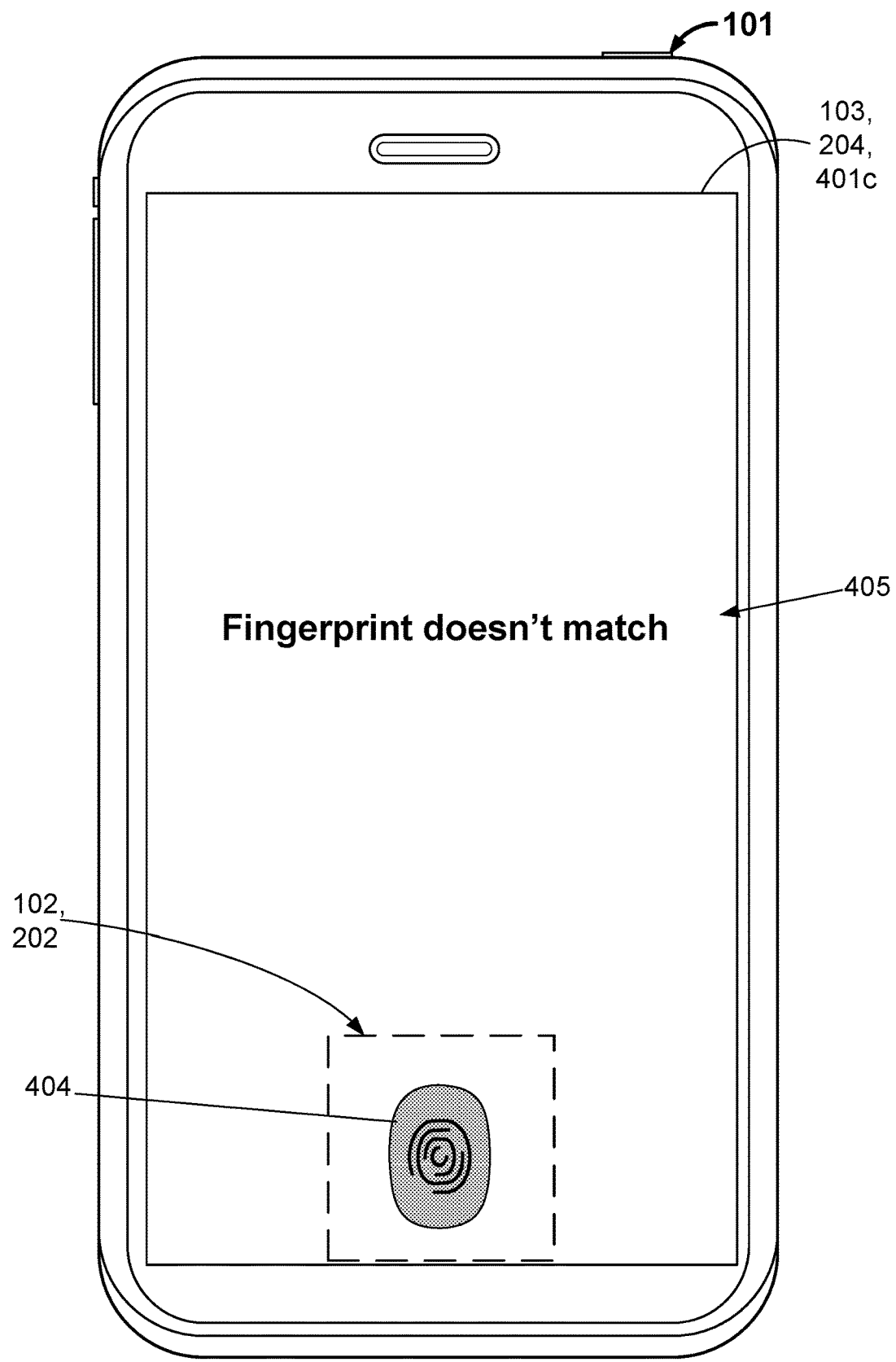

FIGS. 4B and 4C show examples of GUIs 401b and 401c, respectively. In these examples, the GUI 401b of FIG. 4B is presented after the GUI 401a of FIG. 4A and before the GUI 401c of FIG. 4C. In these examples, GUIs 401b and 401c each include a textual prompt area 405. At the time corresponding to FIG. 4B, a user has placed a finger 410 on the fingerprint icon 404 of the GUI 401b. According to this example, a control system of the apparatus has detected the presence of the finger 410, for example responsive to signals from the touch sensor system 103. In this example, the textual prompt area 405 of the GUI 401b includes a message prompting a user to lift the finger after the user feels a vibration. The vibration may, for example, be caused by a haptic feedback system of the apparatus 101, which may be part of the user interface system 104 in some implementations. In some such examples, the control system may be configured to activate the haptic feedback system after fingerprint image data has been successfully obtained by the fingerprint sensor system 102.

At the time corresponding to FIG. 4C, the finger 410 has been lifted from the surface of the apparatus 101. In this example, the textual prompt area 405 of the GUI 401c includes a message indicating that the fingerprint data obtained during the "finger down" state shown in FIG. 4B did not match stored fingerprint data obtained during an enrollment process.

According to some examples, the control system of the apparatus may have previously detected the lift of the finger 410, for example responsive to signals from the touch sensor system 103, controlled the fingerprint sensor system 102 to obtain an air image, processed the recently-obtained fingerprint data (obtained during the "finger down" state shown in FIG. 4B), compared the processed fingerprint data with stored fingerprint data obtained during an enrollment process, and determined that there was no match. According to some such examples, the control system of the apparatus 101 may be operating in a "match on finger lift" mode or an "adaptive match" mode in which functionality of the "match on finger lift" mode had been at least temporarily enabled. Therefore, in such examples, the "no match" message may not have been shown in the textual prompt area 405 until after the finger lift, the obtaining of the air image, the processing with the air image and the subsequent matching attempt.

In some examples, the control system may have performed an unsuccessful authentication process based on fingerprint data obtained during the "finger down" state shown in FIG. 4B and prior to the subsequent acquisition of the air image. However, in the foregoing example, a "no match" message was not previously shown because the control system was operating in a "match on finger lift" mode or an "adaptive match" mode. If the control system had been operating in a "match on finger down" mode (or an "adaptive match" mode in which functionality of the "match on finger down" mode had been at least temporarily enabled), a "no match" message may have previously been shown, for example while the finger 410 was still in contact with the apparatus 101 in the active fingerprint sensor area 202.

Figure 4D:
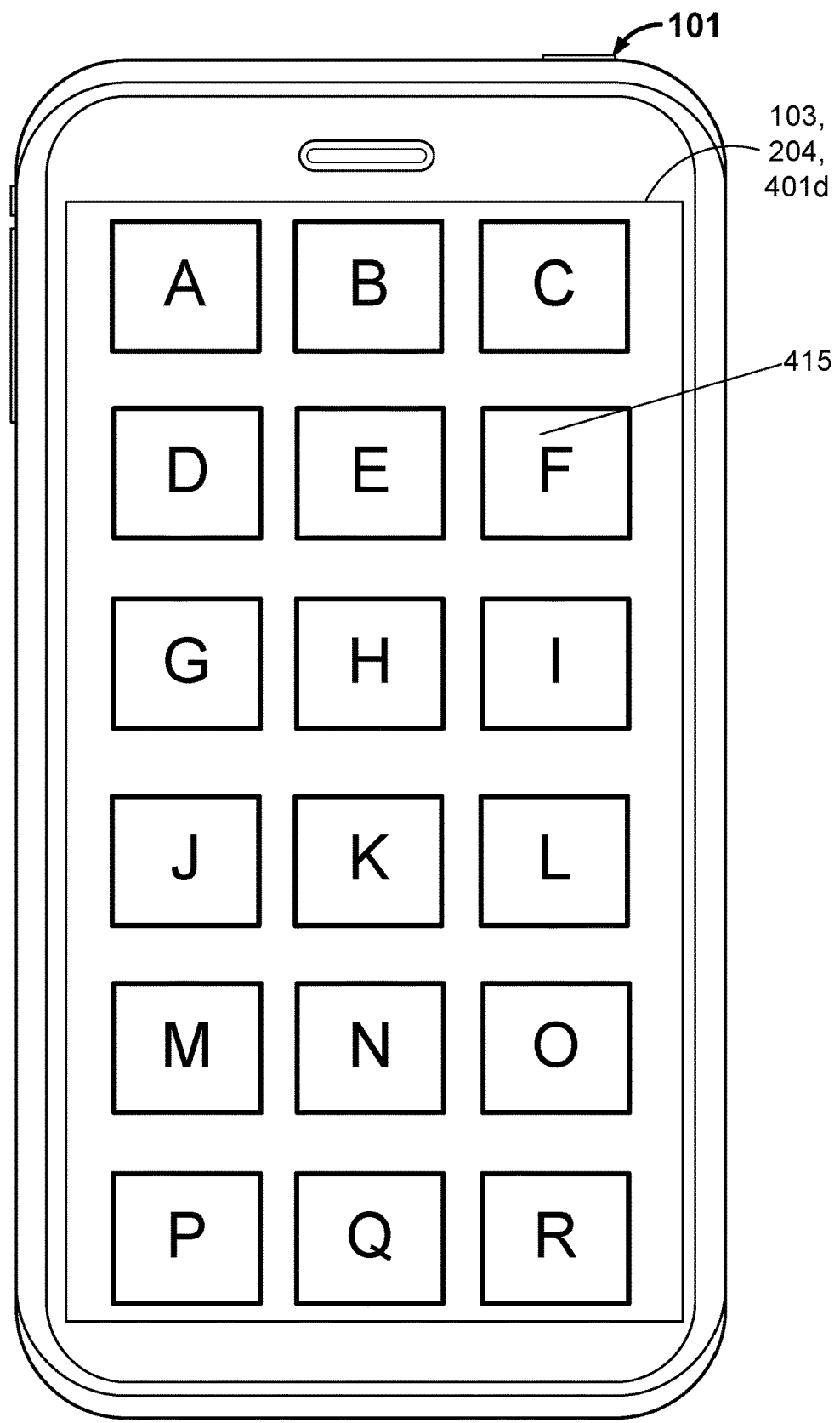

Referring now to FIG. 4D, the GUI 401d shows an example of an "unlocked" state of the apparatus 101, after the successful completion of an authentication process. According to this example, the GUI 401d shows a plurality of icons 415 with which a user may interact to invoke various corresponding software applications or "apps." A textual or other prompt may or may not have been presented by the apparatus 101 before presenting the GUI 401d, depending on the particular implementation.

According to some examples, if the control system had determined that the first authentication process was successful, the control system may have unlocked the apparatus 101 and presented the GUI 401d (or a similar GUI) without first obtaining an air image, etc., after the finger lift. For example, if the control system was operating in a "match on finger down" mode (or an "adaptive match" mode in which functionality of the "match on finger down" mode had been at least temporarily enabled), the control system may have unlocked the apparatus 101 and presented the GUI 401d without first obtaining an air image, etc., after the finger lift. According to some examples, if the control system had determined that the first authentication process was successful, the control system may have unlocked the apparatus 101 and presented the GUI 401d regardless of whether the control system was operating according to a "match on finger down" mode, an "adaptive match" mode or a "match on finger lift" mode. In some examples, if the control system had determined that the first authentication process was successful, the control system may have unlocked the apparatus 101 and presented the GUI 401d (or a similar GUI) while the finger 410 was still in contact with the apparatus.

Figure 5:
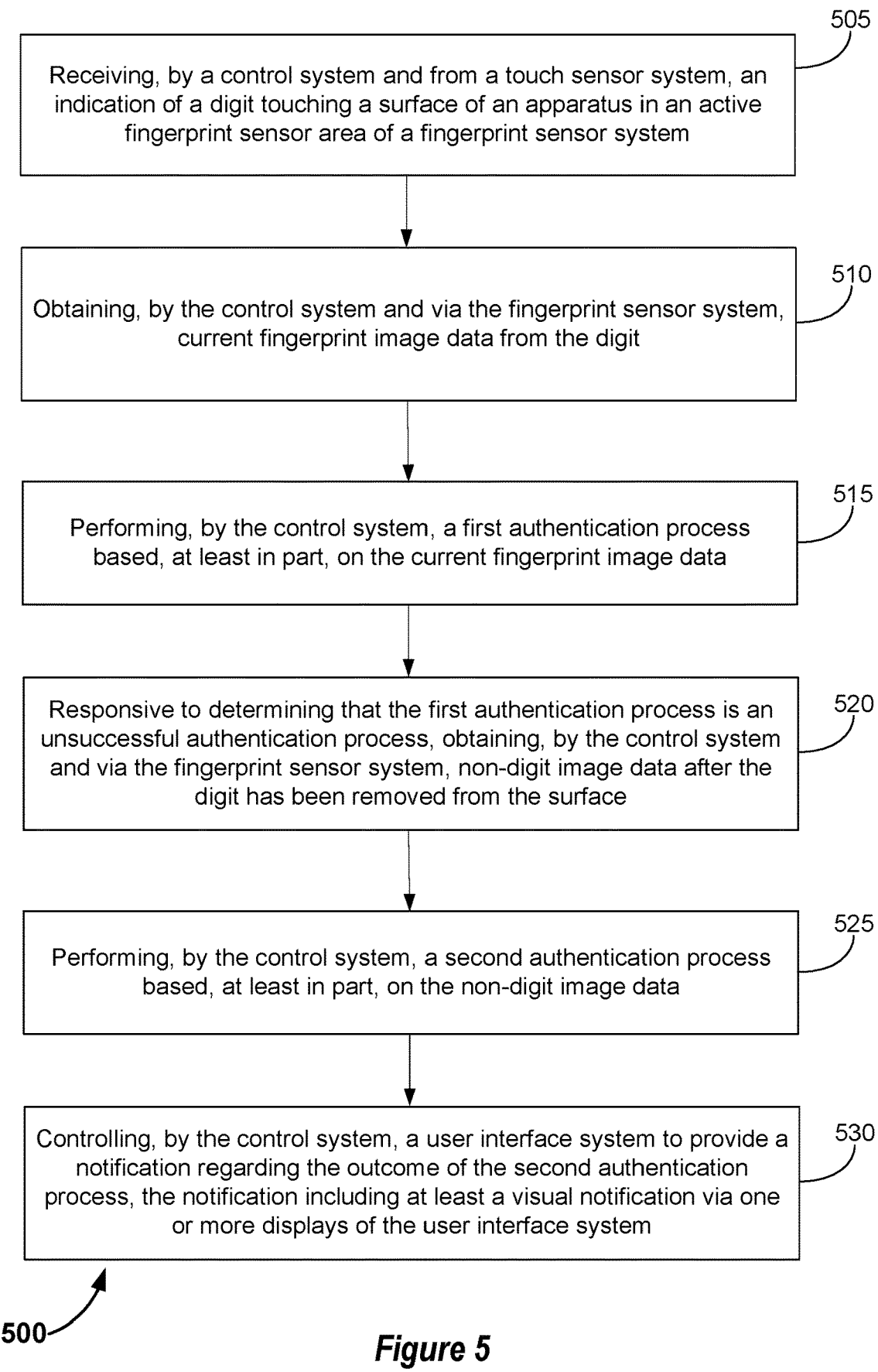
FIG. 5 is a flow diagram that presents examples of operations according to some disclosed methods.

FIG. 5 is a flow diagram that presents examples of operations according to some disclosed methods. The blocks of FIG. 5 may be performed by an apparatus that includes a fingerprint sensor system, a touch sensor system, a user interface system including one or more displays and a control system. The blocks of FIG. 5 may, for example, be performed by the apparatus 101 of FIG. 1 or by a similar apparatus. For example, in some implementations the control system 106 of FIG. 1 may be configured to perform, at least in part, the operations that are described herein with reference to FIG. 5. In some examples, the apparatus may be a mobile device, such as a cellular telephone. However, in other examples, the apparatus may be another type of device, such as a tablet, a laptop, an automobile or component thereof, a wearable device, etc. In yet other examples, more than one device may perform the blocks of FIG. 5. As with other methods disclosed herein, the methods outlined in FIG. 5 may include more or fewer blocks than indicated. Moreover, the blocks of methods disclosed herein are not necessarily performed in the order indicated. In some implementations, one or more blocks may be performed concurrently.

In this example, block 505 involves receiving, by the control system and from the touch sensor system, an indication of a digit touching a surface of an apparatus in an active fingerprint sensor area of the fingerprint sensor system. FIG. 4B, which shows the finger 410 touching the apparatus 101 in the active fingerprint sensor area 102, provides an example of a situation that may cause a touch sensor system to provide an indication of a digit touching a surface of an apparatus in an active fingerprint sensor area.

According to this example, block 510 involves obtaining, by the control system and via the fingerprint sensor system, current fingerprint image data from the digit. Referring again to the example of FIG. 4B, the control system may control the fingerprint sensor system 102 to obtain current fingerprint image data from the finger 410.

In this example, block 515 involves performing, by the control system, a first authentication process based, at least in part, on the current fingerprint image data. If the first authentication process is an unsuccessful authentication process, method 500 may or may not involve providing an indication regarding the unsuccessful outcome of the first authentication process, depending on the particular implementation. For example, as noted elsewhere herein, when the control system is operating in "match on finger lift" mode (or an "adaptive match" mode in which functionality of the "match on finger lift" mode had been at least temporarily enabled), the control system may be configured not to provide an indication of the unsuccessful outcome of the first authentication process.

In some examples, block 510 (or another process of method 500 may involve extracting current fingerprint features from the current fingerprint image data. According to some such examples, the first authentication process of block 515 may involve determining whether the current fingerprint features match previously-obtained fingerprint features. The current fingerprint features may include one or more ridge bifurcations, one or more ridge endings, one or more core points, one or more delta points, one or more sweat pores, one or more ridge contours, one or more ridge edge features, or combinations thereof. Likewise, the previously-obtained fingerprint features may include one or more ridge bifurcations, one or more ridge endings, one or more core points, one or more delta points, one or more sweat pores, one or more ridge contours, one or more ridge edge features, or combinations thereof.

In some examples, method 500 may involve controlling the user interface system to provide a prompt to remove the digit from the surface. The prompt may be, or may include, a textual or other visual prompt, an audio prompt, haptic feedback, or combinations thereof. Some examples may involve controlling the user interface system to provide the prompt after performing the first authentication process.

According to this example, block 520 involves, responsive to determining that the first authentication process is an unsuccessful authentication process, obtaining, by the control system and via the fingerprint sensor system, non-digit image data after the digit has been removed from the surface. In some examples, the non-digit image data may be, or may correspond to, an air image. In some examples, method 500 may involve obtaining the non-digit image data only if the first authentication process is unsuccessful. In some alternative examples, method 500 may involve obtaining the non-digit image data before performing the first authentication process.

In this example, block 525 involves performing, by the control system, a second authentication process based, at least in part, on the currently-obtained non-digit image data. In some examples, method 500 may involve processing the current fingerprint image data with the currently-obtained non-digit image data prior to performing the second authentication process. Some examples may involve performing the second authentication process without obtaining additional fingerprint image data from the digit after the first authentication process is performed. In some such examples, a user may not need to place the digit on the apparatus twice, even if two authentication processes are performed.

According to this example, block 530 involves controlling, by the control system, a user interface system to provide a notification regarding the outcome of the second authentication process. In this example, the notification includes at least a visual notification via one or more displays of the user interface system. In some examples, the notification may include an audio notification. According to some examples, if the second authentication process has an unsuccessful outcome, the notification may be, or may include, a "no match" GUI, such as the GUI 401*c* of FIG. 4C or a similar GUI.

In some examples, if the second authentication process has a successful outcome, the notification of block 530 may be, or may include, an implicit notification, such as a GUI corresponding to an unlocked condition screen. The GUI 401*d* of FIG. 4D provides one such example. Alternatively, or additionally, if the second authentication process has a successful outcome, the notification may be, or may include, an express notification, such as a GUI indicating a fingerprint match, a welcome message, or a combination thereof.

In some examples, method 500 may involve obtaining the non-digit image data and performing the second authentication process without controlling the user interface system to provide a notification regarding an outcome of the first authentication process. For example, if the control system was operating in a "match on finger lift" mode (or an "adaptive match" mode in which functionality of the "match on finger lift" mode had been at least temporarily enabled), the control system may be configured to obtain the non-digit image data and to perform the second authentication process without controlling the user interface system to provide a notification regarding an outcome of the first authentication process.

Implementation examples are described in the following numbered clauses:

1. An apparatus, including: a fingerprint sensor system; a touch sensor system; a user interface system, the user interface system including one or more displays; and a control system configured for communication with the fingerprint sensor system, the touch sensor system and the user interface system, the control system being further configured to: receive, from the touch sensor system, an indication of a digit touching a surface of the apparatus in an active fingerprint sensor area of the fingerprint sensor system; obtain, via the fingerprint sensor system, current fingerprint image data from the digit; perform a first authentication process based, at least in part, on the current fingerprint image data; responsive to determining that the first authentication process is an unsuccessful authentication process, obtain, via the fingerprint sensor system, non-digit image data after the digit has been removed from the surface; perform a second authentication process based, at least in part, on the non-digit image data; and control the user interface system to provide a notification regarding the outcome of the second authentication process, the notification including at least a visual notification via the one or more displays.

2. The apparatus of clause 1, where the control system is configured to obtain the non-digit image data and to perform the second authentication process without controlling the user interface system to provide a notification regarding an outcome of the first authentication process.

3. The apparatus of clause 1 or clause 2, where the non-digit image data corresponds to an air image.

4. The apparatus of any one of clauses 1-3, where the control system is further configured to control the user interface system to provide a prompt to remove the digit from the surface.

5. The apparatus of clause 4, where the control system is configured to control the user interface system to provide the prompt after performing the first authentication process.

6. The apparatus of clause 4 or clause 5, where the user interface system includes a haptic feedback system and where the prompt includes a visual notification via the one or more displays, haptic feedback provided via the haptic feedback system, or a combination thereof.

7. The apparatus of any one of clauses 4-6, where the user interface system includes a loudspeaker system and where the prompt includes a visual notification via the one or more displays, audio feedback provided via the loudspeaker system, or a combination thereof.

8. The apparatus of any one of clauses 1-7, where the control system is configured to perform the second authentication process without obtaining additional fingerprint image data from the digit after the first authentication process is performed.

9. The apparatus of any one of clauses 1-8, where the control system is configured to extract current fingerprint features from the current fingerprint image data and where the first authentication process involves determining whether the current fingerprint features match previously-obtained fingerprint features.

10. The apparatus of clause 9, where the previously-obtained fingerprint features include one or more ridge bifurcations, one or more ridge endings, one or more core points, one or more delta points, one or more sweat pores, one or more ridge contours, one or more ridge edge features, or combinations thereof.

11. An method, including: receiving, by a control system and from a touch sensor system, an indication of a digit touching a surface of an apparatus in an active fingerprint sensor area of a fingerprint sensor system; obtaining, by the control system and via the fingerprint sensor system, current fingerprint image data from the digit; performing, by the control system, a first authentication process based, at least in part, on the current fingerprint image data; responsive to determining that the first authentication process is an unsuccessful authentication process, obtaining, by the control system and via the fingerprint sensor system, non-digit image data after the digit has been removed from the surface; performing, by the control system, a second authentication process based, at least in part, on the non-digit image data; and controlling, by the control system, a user interface system to provide a notification regarding the outcome of the second authentication process, the notification including at least a visual notification via one or more displays of the user interface system.

12. The method of clause 11, also including obtaining the non-digit image data and performing the second authentication process without controlling the user interface system to provide a notification regarding an outcome of the first authentication process.

13. The method of clause 11 or clause 12, where the non-digit image data corresponds to an air image.

14. The method of clause any one of clauses 11-13, also including controlling the user interface system to provide a prompt to remove the digit from the surface.

15. The method of clause 14, also including controlling the user interface system to provide the prompt after performing the first authentication process.

16. The method of clause 14 or clause 15, where the user interface system includes a haptic feedback system and where the prompt includes a visual notification via the one or more displays, haptic feedback provided via the haptic feedback system, or a combination thereof.

17. The method of clause any one of clauses 14-16, where the user interface system includes a loudspeaker system and where the prompt includes a visual notification via the one or more displays, audio feedback provided via the loudspeaker system, or a combination thereof.

18. The method of any one of clauses 11-17, also including performing the second authentication process without obtaining additional fingerprint image data from the digit after the first authentication process is performed.

19. The method of any one of clauses 11-18, also including extracting current fingerprint features from the current fingerprint image data and where the first authentication process involves determining whether the current fingerprint features match previously-obtained fingerprint features.

20. The method of clause 19, where the previously-obtained fingerprint features include one or more ridge bifurcations, one or more ridge endings, one or more core points, one or more delta points, one or more sweat pores, one or more ridge contours, one or more ridge edge features, or combinations thereof.

21. One or more non-transitory media having instructions for performing a method stored thereon, the method including: receiving, by a control system and from a touch sensor system, an indication of a digit touching a surface of an apparatus in an active fingerprint sensor area of a fingerprint sensor system; obtaining, by the control system and via the fingerprint sensor system, current fingerprint image data from the digit; performing, by the control system, a first authentication process based, at least in part, on the current fingerprint image data; responsive to determining that the first authentication process is an unsuccessful authentication process, obtaining, by the control system and via the fingerprint sensor system, non-digit image data after the digit has been removed from the surface; performing, by the control system, a second authentication process based, at least in part, on the non-digit image data; and controlling, by the control system, a user interface system to provide a notification regarding the outcome of the second authentication process, the notification including at least a visual notification via one or more displays of the user interface system.

22. The one or more non-transitory media of clause 21, wherein the method also involves obtaining the non-digit image data and performing the second authentication process without controlling the user interface system to provide a notification regarding an outcome of the first authentication process.

23. The one or more non-transitory media of clause 21 or clause 22, wherein the non-digit image data corresponds to an air image.

24. The one or more non-transitory media of clause 21, wherein the method also involves controlling the user interface system to provide a prompt to remove the digit from the surface.

25. The one or more non-transitory media of clause 24, wherein the method also involves controlling the user interface system to provide the prompt after performing the first authentication process.

26. The one or more non-transitory media of clause 24 or clause 25, wherein the user interface system includes a haptic feedback system and wherein the prompt includes a visual notification via the one or more displays, haptic feedback provided via the haptic feedback system, or a combination thereof.

27. The one or more non-transitory media of any one of clauses 24-26, wherein the user interface system includes a loudspeaker system and wherein the prompt includes a visual notification via the one or more displays, audio feedback provided via the loudspeaker system, or a combination thereof.

28. An apparatus, including: a fingerprint sensor system; a touch sensor system; a user interface system, the user interface system including one or more displays; and control means for: receiving, from the touch sensor system, an indication of a digit touching a surface of the apparatus in an active fingerprint sensor area of the fingerprint sensor system; obtaining, via the fingerprint sensor system, current fingerprint image data from the digit; performing a first authentication process based, at least in part, on the current fingerprint image data; responsive to determining that the first authentication process is an unsuccessful authentication process, obtaining, via the fingerprint sensor system, non-digit image data after the digit has been removed from the surface; performing a second authentication process based, at least in part, on the non-digit image data; and controlling the user interface system to provide a notification regarding the outcome of the second authentication process, the notification including at least a visual notification via the one or more displays.

29. The apparatus of clause 28, where the control means includes means for obtaining the non-digit image data and for performing the second authentication process without controlling the user interface system to provide a notification regarding an outcome of the first authentication process.

30. The apparatus of clause 28 or clause 29, where the non-digit image data corresponds to an air image.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations presented herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order presented or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

What is claimed is:

1. An apparatus, comprising:
    a fingerprint sensor system;
    a touch sensor system;
    a user interface system, the user interface system including one or more displays; and
    a control system configured for communication with the fingerprint sensor system, the touch sensor system and the user interface system, the control system being further configured to:
        receive, from the touch sensor system, an indication of a digit touching a surface of the apparatus in an active fingerprint sensor area of the fingerprint sensor system;
        obtain, via the fingerprint sensor system, current fingerprint image data from the digit;
        perform a first authentication process based, at least in part, on the current fingerprint image data;
        responsive to determining that the first authentication process is an unsuccessful authentication process, obtain, via the fingerprint sensor system, non-digit image data after the digit has been removed from the surface;
        perform a second authentication process based, at least in part, on the non-digit image data; and
        control the user interface system to provide a notification regarding the outcome of the second authentication process, the notification including at least a visual notification via the one or more displays.

2. The apparatus of claim 1, wherein the control system is configured to obtain the non-digit image data and to perform the second authentication process without controlling the user interface system to provide a notification regarding an outcome of the first authentication process.

3. The apparatus of claim 1, wherein the non-digit image data corresponds to an air image.

4. The apparatus of claim 1, wherein the control system is further configured to control the user interface system to provide a prompt to remove the digit from the surface.

5. The apparatus of claim 4, wherein the control system is configured to control the user interface system to provide the prompt after performing the first authentication process.

6. The apparatus of claim 4, wherein the user interface system includes a haptic feedback system and wherein the prompt includes a visual notification via the one or more displays, haptic feedback provided via the haptic feedback system, or a combination thereof.

7. The apparatus of claim 4, wherein the user interface system includes a loudspeaker system and wherein the prompt includes a visual notification via the one or more displays, audio feedback provided via the loudspeaker system, or a combination thereof.

8. The apparatus of claim 1, wherein the control system is configured to perform the second authentication process without obtaining additional fingerprint image data from the digit after the first authentication process is performed.

9. The apparatus of claim 1, wherein the control system is configured to extract current fingerprint features from the current fingerprint image data and wherein the first authentication process involves determining whether the current fingerprint features match previously-obtained fingerprint features.

10. The apparatus of claim 9, wherein the previously-obtained fingerprint features include one or more ridge bifurcations, one or more ridge endings, one or more core points, one or more delta points, one or more sweat pores, one or more ridge contours, one or more ridge edge features, or combinations thereof.

11. An method, comprising:
    receiving, by a control system and from a touch sensor system, an indication of a digit touching a surface of an apparatus in an active fingerprint sensor area of a fingerprint sensor system;
    obtaining, by the control system and via the fingerprint sensor system, current fingerprint image data from the digit;
    performing, by the control system, a first authentication process based, at least in part, on the current fingerprint image data;
    responsive to determining that the first authentication process is an unsuccessful authentication process, obtaining, by the control system and via the fingerprint sensor system, non-digit image data after the digit has been removed from the surface;
    performing, by the control system, a second authentication process based, at least in part, on the non-digit image data; and
    controlling, by the control system, a user interface system to provide a notification regarding the outcome of the second authentication process, the notification including at least a visual notification via one or more displays of the user interface system.

12. The method of claim 11, further comprising obtaining the non-digit image data and performing the second authentication process without controlling the user interface system to provide a notification regarding an outcome of the first authentication process.

13. The method of claim 11, wherein the non-digit image data corresponds to an air image.

14. The method of claim 11, further comprising controlling the user interface system to provide a prompt to remove the digit from the surface.

15. The method of claim 14, further comprising controlling the user interface system to provide the prompt after performing the first authentication process.

16. The method of claim 14, wherein the user interface system includes a haptic feedback system and wherein the prompt includes a visual notification via the one or more displays, haptic feedback provided via the haptic feedback system, or a combination thereof.

17. The method of claim 14, wherein the user interface system includes a loudspeaker system and wherein the prompt includes a visual notification via the one or more displays, audio feedback provided via the loudspeaker system, or a combination thereof.

18. The method of claim 11, further comprising performing the second authentication process without obtaining additional fingerprint image data from the digit after the first authentication process is performed.

19. The method of claim 11, further comprising extracting current fingerprint features from the current fingerprint image data and wherein the first authentication process involves determining whether the current fingerprint features match previously-obtained fingerprint features.

20. The method of claim 19, wherein the previously-obtained fingerprint features include one or more ridge bifurcations, one or more ridge endings, one or more core points, one or more delta points, one or more sweat pores, one or more ridge contours, one or more ridge edge features, or combinations thereof.

21. One or more non-transitory media having instructions for performing a method stored thereon, the method comprising:
receiving, by a control system and from a touch sensor system, an indication of a digit touching a surface of an apparatus in an active fingerprint sensor area of a fingerprint sensor system;
obtaining, by the control system and via the fingerprint sensor system, current fingerprint image data from the digit;
performing, by the control system, a first authentication process based, at least in part, on the current fingerprint image data;
responsive to determining that the first authentication process is an unsuccessful authentication process, obtaining, by the control system and via the fingerprint sensor system, non-digit image data after the digit has been removed from the surface;
performing, by the control system, a second authentication process based, at least in part, on the non-digit image data; and
controlling, by the control system, a user interface system to provide a notification regarding the outcome of the second authentication process, the notification including at least a visual notification via one or more displays of the user interface system.

22. The one or more non-transitory media of claim 21, wherein the method also involves obtaining the non-digit image data and performing the second authentication process without controlling the user interface system to provide a notification regarding an outcome of the first authentication process.

23. The one or more non-transitory media of claim 21, wherein the non-digit image data corresponds to an air image.

24. The one or more non-transitory media of claim 21, wherein the method also involves controlling the user interface system to provide a prompt to remove the digit from the surface.

25. The one or more non-transitory media of claim 24, wherein the method also involves controlling the user interface system to provide the prompt after performing the first authentication process.

26. The one or more non-transitory media of claim 24, wherein the user interface system includes a haptic feedback system and wherein the prompt includes a visual notification via the one or more displays, haptic feedback provided via the haptic feedback system, or a combination thereof.

27. The one or more non-transitory media of claim 24, wherein the user interface system includes a loudspeaker system and wherein the prompt includes a visual notification via the one or more displays, audio feedback provided via the loudspeaker system, or a combination thereof.

28. An apparatus, comprising:
a fingerprint sensor system;
a touch sensor system;
a user interface system, the user interface system including one or more displays; and
control means for:
receiving, from the touch sensor system, an indication of a digit touching a surface of the apparatus in an active fingerprint sensor area of the fingerprint sensor system;
obtaining, via the fingerprint sensor system, current fingerprint image data from the digit;
performing a first authentication process based, at least in part, on the current fingerprint image data;
responsive to determining that the first authentication process is an unsuccessful authentication process, obtaining, via the fingerprint sensor system, non-digit image data after the digit has been removed from the surface;
performing a second authentication process based, at least in part, on the non-digit image data; and
controlling the user interface system to provide a notification regarding the outcome of the second authentication process, the notification including at least a visual notification via the one or more displays.

29. The apparatus of claim 28, wherein the control means includes means for obtaining the non-digit image data and for performing the second authentication process without controlling the user interface system to provide a notification regarding an outcome of the first authentication process.

30. The apparatus of claim 28, wherein the non-digit image data corresponds to an air image.

* * * * *